United States Patent
Wohl et al.

[15] 3,676,839
[45] July 11, 1972

[54] SWITCHING APPARATUS FOR A PHASED TRANSDUCER ARRAY

[72] Inventors: Charles J. Wohl, Englewood Cliffs, N.J.; Jonathan L. Schere, Hartsdale; Thomas V. Costello, Bronx, both of N.Y.

[73] Assignee: Edco Corporation, College Point, N.Y.

[22] Filed: Nov. 10, 1969

[21] Appl. No.: 875,315

[52] U.S. Cl. ............................. 340/6 R, 340/16 R, 343/115
[51] Int. Cl. ............................................................ G01s 3/00
[58] Field of Search .......... 340/6 R, 16 R; 343/16 R, 100 SA, 343/115

[56] References Cited
UNITED STATES PATENTS
3,526,872  9/1970  Gulick, Jr. et al. ........................ 340/6

Primary Examiner—Richard A. Farley
Attorney—Davis, Hoxie, Faithfull & Hapgood

[57] ABSTRACT

Analog switching apparatus electrically focuses a phased transducer array by interconnecting the outputs of selected transducer elements with selected taps of a multitapped electrical delay line. A first portion of the switching apparatus selects a subset of the transducer array to define a focusing search sector, and a second switching apparatus portion sequentially advances through a complete switching cycle for each transducer subset selection to traverse the focus of the array across the search sector in discrete increments.

5 Claims, 5 Drawing Figures

FIG. I

INVENTORS
CHARLES J. WOHL
JONATHAN L. SCHERE
BY THOMAS V. COSTELLO

Davis, Hoxie, Faithfull & Hapgood
ATTORNEYS

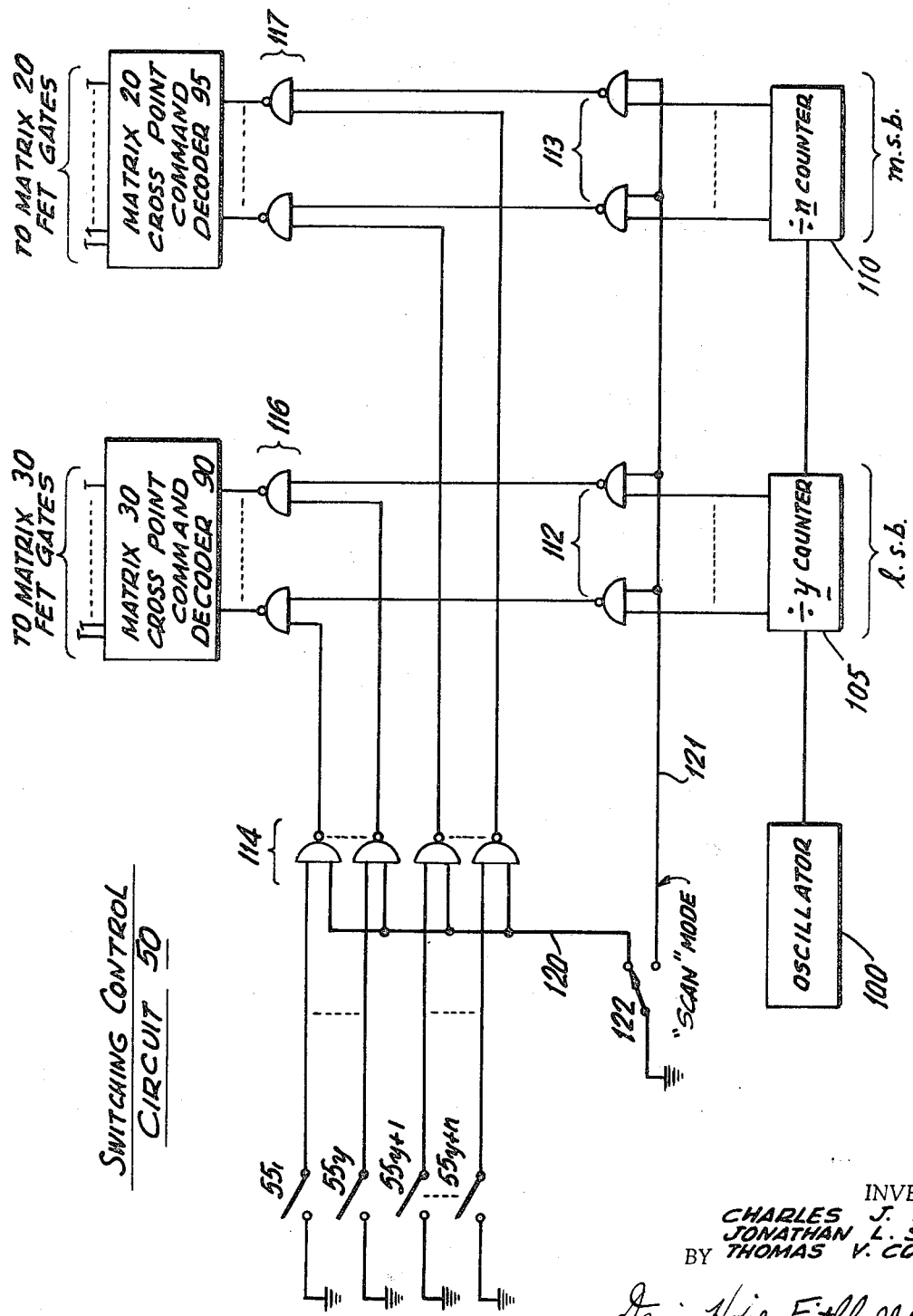

SWITCHING APPARATUS FOR A PHASED TRANSDUCER ARRAY

The invention relates to switched transducer assemblies and, more specifically, to an improved switching arrangement for electronically phasing an array of transducers.

Two basic antenna, hydrophone, or other receiving transducer configurations have been employed for scanning about a transducer location to acquire signals from unspecified (or hostile) source or sources. The first, older method employs a directional receiving transducer which is continuously rotated about its axis. The orientation of the transducer when a signal is received identifies the relative bearing from the transducer to the signal producing source. Such systems, however, are limited in accuracy by the angular width of the receiving transducer response pattern; have limited scanning speeds since transducers, sometimes of relatively massive size, must be physically rotated; and are subject to mechanical wear, breakdown, and mounting and drive problems by reason of their mechanical rotational requirement.

The second widely employed transducer arrangement employs an array of broad or omnidirectional receiving transducers which are physically stationary. The outputs of the transducer elements are steered, or gated by switching apparatus through appropriate delays whereupon they are additively combined. The combined outputs of the delay elements provide a measure of any plane signal wavefront which may have approached the transducer array from a particular direction a short time previously corresponding to the longest time delay employed.

The specific azimuth instantaneously scanned by the transducer array is determined by a selection of a particular subset of the transducers, and by the particular interconnection of the selected transducers with the signal delaying elements which are characterized by varying time delays. The scanning direction may be quickly changed by varying the connection pattern between the transducers and the delay elements. This variation may include a cyclic series of interconnection to scan in a circle (or a three-dimensional transducer array) or any other desired pattern. Further, the array may be quickly focused in a specific, predetermined direction by instituting appropriate connections.

One widely employed switching arrangement heretofore employed in scanning for underwater acoustical signal sources has employed a mechanical rotating switch to cyclically interconnect a plurality of hydrophone staves with the taps of a multitapped delay line. The output of the delay line provides a measure of incoming acoustical plane wavefronts along an instantaneous sensing axis electrically determined by the transducer-delay line interconnections which, in turn, are determined by the spatial orientation of the rotating element.

The rotating switch includes a series of commutating brush-contact interface switches for effecting all of the appropriate scanning interconnections during each complete switch rotation. To examine any single axis, the switch is positioned, as by a servomechanism arrangement, to reside along the desired axis.

However, such mechanical switches are subject to mechanical breakdown and, at best, require periodic down (inoperative) time for contact and brush cleaning by skilled personnel. Also, brush wear, dirty contacts and the like increase the switch contact impedance thereby generating errors in the analog signals being commutated. Further, errors are produced in scanning along a preselected axis by switch positioning limitations associated with feedback servo systems.

Accordingly, it is an object of the present invention to provide an improved switching apparatus for effecting the requisite interconnections in a phased transducer array.

More specifically, an object of the present invention is the provision of a transducer switching arrangement which is highly reliable; which may be rapidly sequenced; and which employs relatively few switching cross-points compared with prior art structures.

The above and other objects of the present arrangement are realized in a specific, illustrative switching arrangement for sequentially interconnecting selected receiving hydrophone staves with the taps on a delay line. Assuming $n$ staves and $k$ delay line taps, the arrangement employs only a small fraction of the $n \times k$ switching cross-points required for a nonblocking matrix to interconnect each hydrophone stave with each delay line tap.

The switching arrangement employs a first set of matrices which connect a given subset of the staves to a set of output terminals. These matrices effect a "rough" azimuth selection process specifying the phasing, or focusing of the transducer array to a bounded angular sector. A second matrix is employed to distribute the set of selected transducer output terminals among the delay line taps. The second matrix is completely cycled to produce a number of interconnection patterns for each setting of the first matrices, and essentially sweeps the array phasing across the sector range in discrete steps. Once completed, the first matrix structure is advanced one state to define a new focusing sector, and the second matrix is again completely cycled to sweep across the second sector. The process is repeated, either intermittently or continuously, until the transducer array has been phased, or focused throughout its desired range of bearings.

The above and other features and advantages of the present invention are realized in a specific, illustrative embodiment thereof, presented in detail hereinbelow in conjunction with the accompanying drawing, in which.

Figure 1:
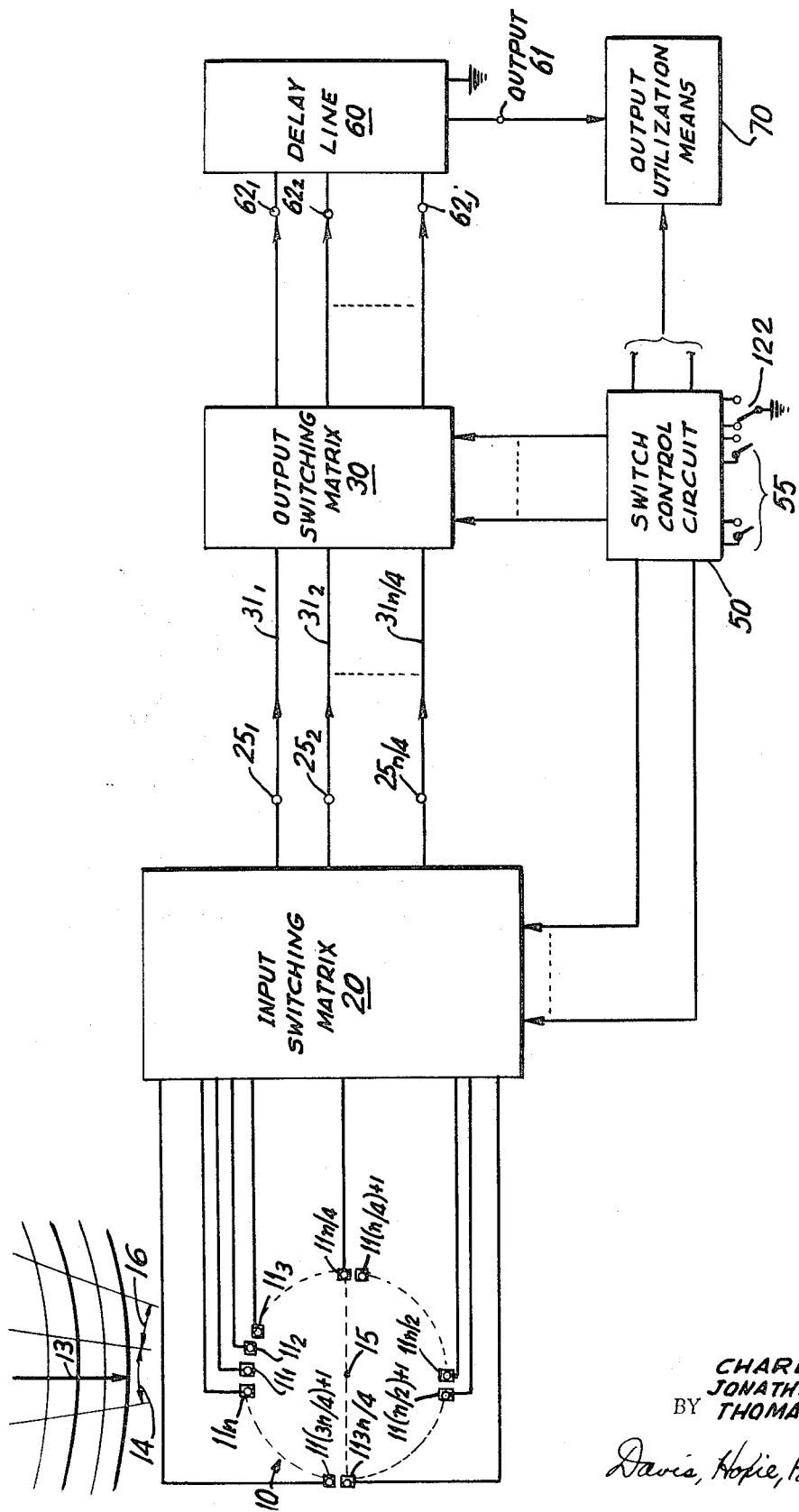
FIG. 1 depicts in block diagram form an illustrative phased transducer switching arrangement embodying the principles of the present invention.
Figure 2:
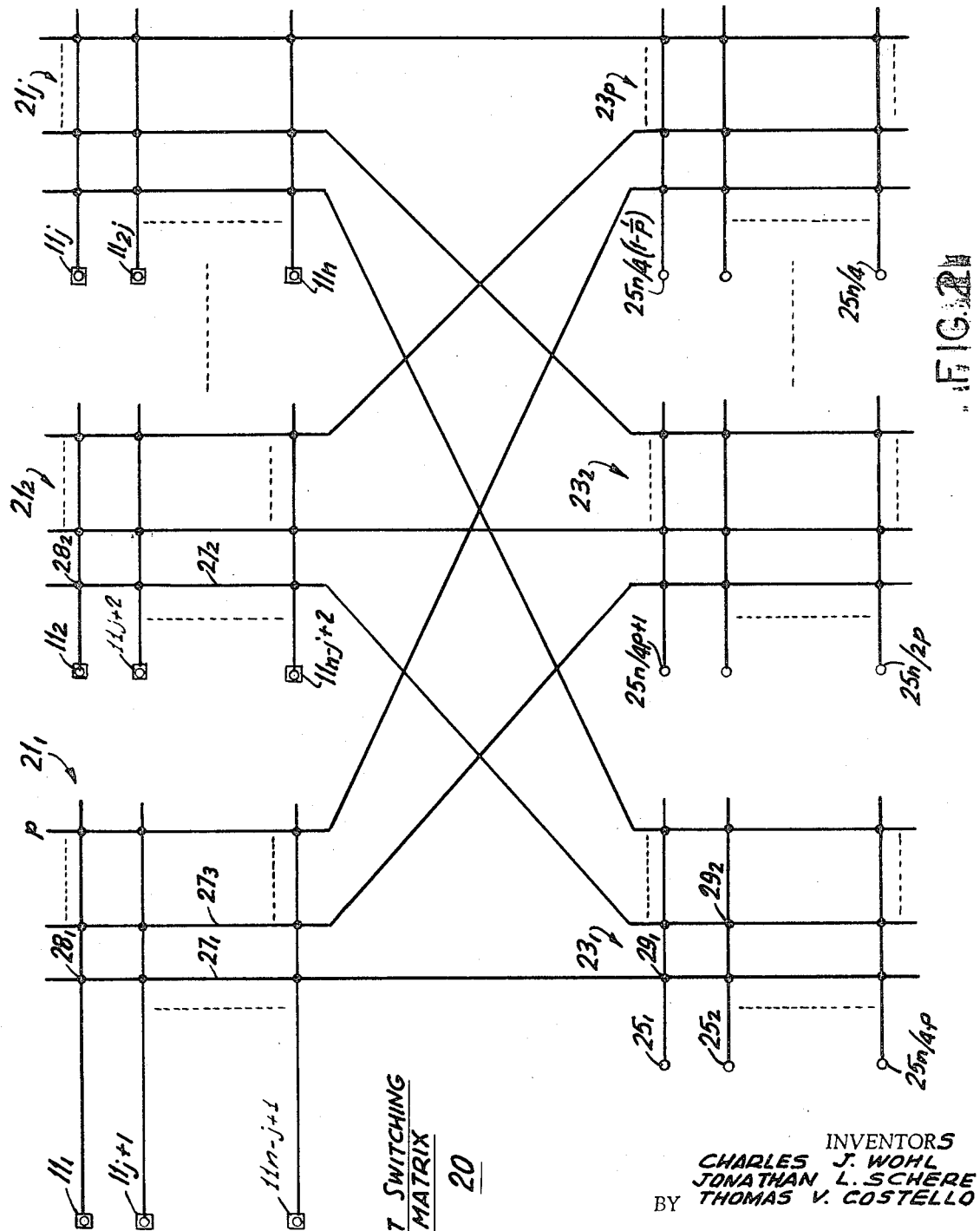
FIG. 2 illustrates in detail an input transducer selection matrix 20 shown in the arrangement of FIG. 1.
Figure 3:
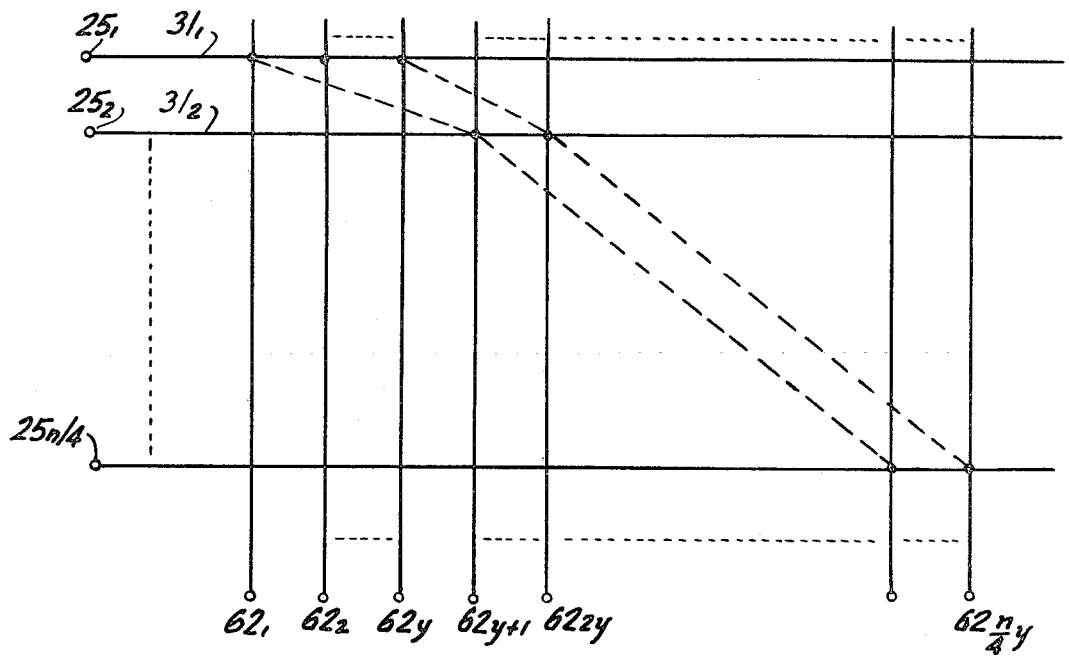
FIG. 3 shows in detail an output switching matrix 30 shown in the arrangement of FIG. 1.
Figure 4:
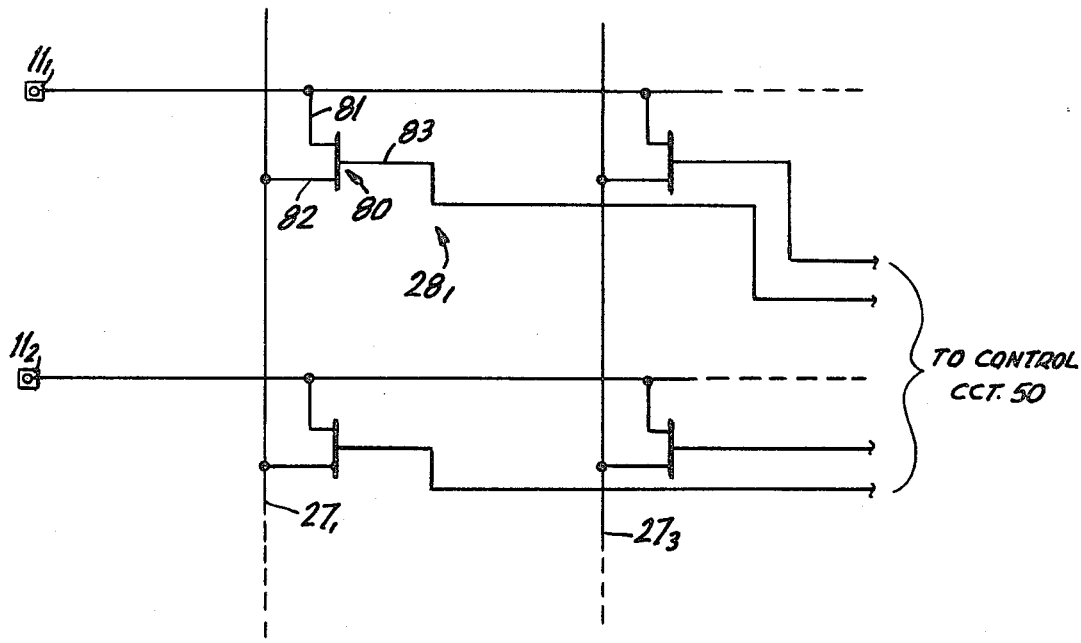

FIG. 4 illustrates a subgroup of cross-point switching elements for the matrices 20 and 30 of FIGS. 2 and 3; and FIG. 5 depicts the control structure for the input matrix 20 and output matrix 30 of FIG. 1.

Referring now to FIG. 1, there is shown an illustrative phased receiving transducer array 10 which receives signals from any selected direction (or from all directions via a scanning process), and which provides a measure of a signal received along its focused axis at an output terminal 61. For concreteness and without limitation, an underwater environment will be assumed, with the transducers comprising a plurality of $n$ hydrophone staves $11_1$–$11_n$ which are responsive to acoustical signals. The apparatus of FIG. 1 is useful, for example, for underwater survey, exploration or military applications where the relative bearing from the array 10 to a sound source or sources is to be identified. A sound source as referred to herein may comprise one which directly emits acoustical energy, or one which reflects energy emitted by a controlled signal source.

The transducers $11_1$–$11_n$ are preferably arranged in a circular pattern to provide uniform signal acquisition for energy incident from any direction, although any other physical hydrophone array may be employed. To search for signals (assumed of plane wave form) approaching from any direction only a subset of the hydrophones (e.g., one quarter or $n/4$) which proximately face the plane wavefront are employed. For example, to search for a signal 13 approaching the hydrophone array 10 within a bounded angular sector 14 (of width $360/n$ degrees), the hydrophones $11_1$–$11_{n/4}$ may be employed.

The acoustical wave 13 within the sector 14 will impinge upon each of the hydrophones $11_1$–$11_{n/4}$ at different times which depend upon the particular direction of wave propogation. Accordingly, the hydrophone array 10 may be focused to a particular direction within the sector 14, e.g., to that of the wave 13, by first selecting the hydrophones $11_1$–$11_{n/4}$; by providing maximum delay for the output of hydrophone $11_1$; and by effecting monotonically decreasing delays for the other hydrophone staves $11_2$ through $11_{n/4}$ to essentially converge the outputs from the hydrophone array $11_1$–$11_{n/4}$ from a quarter circle to a detection axis 15 broadside to the incoming wave. Similarly, a $360/n$ degree angular sector 16 adjacent to the sector 14 may be examined by a selection of $n/4$ hydrophone staves $11_2-11_{(n/4)+1}$, and so on.

Selection of $n/4$ of the hydrophones 11 to examine a corresponding $360/n$ degree sector is accomplished by an input switching matrix 20. The matrix 20 accepts the continuous analog output signals from the $n$ hydrophones 11, and supplies the outputs from $n/4$ contiguous selected hydrophones to $n/4$ output terminals $25_1-25_{n/4}$, and via a plurality of $n/4$ leads $31_1-31_{/4}$ to an output switching matrix 30.

The output switching matrix 30 connects the outputs from the $n/4$ selected hydrophones to a selected pattern of taps 62 of a delay line 60. The delay line taps 62 provide differing delays in the time required for a signal entering any tap to arrive at the delay line output 61.

As discussed above, the matrix 20 selects $n/4$ hydrophones 11 thereby defining a $360/n$ degree focusing sector for the phased hydrophone array. For any such sector selection, the output matrix 30 effects a plurality of connections (scan mode) between the selected hydrophones and selected delay line taps 62 to incrementally vary the focus of the hydrophone array across the sector. In general, as is well known to those skilled in the art, some of the taps 62 may not be connected for any particular state of the matrix 30, while two or more other inputs may be bridged. Each sector may be subdivided as minutely as desired by providing sufficient states for the matrix 30 together with sufficient delay increments.

The matrices 20 and 30 are sequenced by a switch control circuit 50 which may be operated in either of two modes selected by a switch 122. In the simpler case, when a single, specific azimuth is to be examined for a possible signal source, a plurality of switches 55 may be manually set to effect the proper matrix 20 and 30 connections for electrically focusing the hydrophone array 10 along the desired azimuth. This focus will be automatically instituted and maintained without the inherent inaccuracy associated with prior art servo systems. Also, the switches 55 (which may comprise electronic switching devices) may be varied to redefine the focus of the array 10 to lie along a new bearing or bearings.

Correspondingly, when operated in a scan or search mode by an alternate setting of the switch 122, the control circuit 50 establishes connections in the input matrix 20 to select $n/4$ contiguous hydrophones 11 thereby defining a search sector, and then cycles the matrix 30 through a series of connection patterns to sweep the focus of the hydrophone array 10 across the selected sector. The circuit 50 then updates the matrix 20 constraining it to delete a hydrophone 11 at the end of the selected subset opposite to the direction of scanning, and to add one hydrophone on the other end. This effectively redefines and rotates the selected sector $360/n$ degrees in the scanning direction. The circuit 50 next recycles the switch 30 throughout its inventory of states to sweep the focus of the array 10 through the second sector. The scanning process may continue indefinitely, or may be terminated after a portion of a circular sweep or after a predetermined number of complete scans.

For any one setting of the matrices 20 and 30, the output terminal 61 of the delay line 60 will supply an output signal if a signal source is present along the sensed azimuth. The strength of the analog delay line output is proportional to the strength of the emitted signal, if any. The incidence of an output, together with information identifying the state of the matrices 20 and 30 (e.g., the contents of a counter or register in the control circuit 50 as discussed hereinbelow) when a signal is received identifies the relative bearing from the array 10 to the source. These signals are supplied to a suitable output utilization means, e.g., an alarm circuit, printer, cathode ray or other display recorder, data processing equipment, fire control system or the like.

An illustrative input switching matrix 20 is shown in FIG. 2 and may illustratively include $j$ $p$-by-$n/j$ matrices 21 where the horizontal axes of the matrices 21 are each connected to a different hydrophone 11 as shown. The composite matrix 20 further includes $p$ $n/4p$-by-$j$ matrices 23, where the horizontal axes of the matrices 23 are each connected to a different matrix 20 output terminal 25. Analog switches 28, shown in detail in FIG. 4 and considered in detail below, are disposed at all electrical matrix intersections in the arrangement of FIG. 2.

To connect any desired subset of the hydrophones 11 to the matrix output terminals 25, an appropriate group of $n/4$ crosspoint analog switches 28 are closed, i.e., effect a cross-point connection. For example, to focus the hydrophone array within the sector 14, the switches $28_1$ and $29_1$ are closed to connect the hydrophone $11_1$ to the terminal $25_1$ via a lead $27_1$; the switches $28_2$ and $29_2$ closed to connect the hydrophone $11_2$ to the terminal $25_2$; and so forth until the requisite $n/4$ hydrophone staves $11_1-11_{n/4}$ are connected to terminals $25_1-25_{/4}$, respectively. Similarly, it is observed that any other permissible connection pattern of $n/4$ contiguous hydrophones to the terminals 25 may be established by the blocking switching structure of FIG. 2.

It is noted that a single $n$-by-$n/4$ matrix may be employed for the input switching matrix 20. However, the blocking, plural matrix switching arrangement shown in FIG. 2 employs far fewer cross-points than such a single, nonblocking matrix.

An analog cross-point switch 28, illustrative of all cross-point switches 28 and 29 in FIG. 2, and also those in the output matrix 30 as well, may comprise a field effect transistor (FET) 80 as depicted in FIG. 4. The transistor 80 includes source and drain terminals 81 and 82 connected to the cross-point defining matrix leads and a gate terminal 83 driven by the control circuit 50. Depending upon the N or P nature of the FET channel, and whether the device operates in an enhancement or depletion mode, one binary voltage level selectively supplied to the FET gate 83 will render the source-drain channel a low impedance (switch closed) and a second level will cause the device 80 to exhibit a very high impedance (switch open).

Assuming that each $360/n$ degree sector is to be subdivided into $y$ increments, the delay line 60 may include $(n/4) \cdot y$ input terminals 62 wherein $y$ terminals 62 are dedicated to each of the $n/4$ input lines 31 (and thus to each input switch 20 output terminal 25). Thus, the matrix 30 sequentially connects each line 31 through its range of delays in $y$ steps to sweep through the sector specified by the input switch 20 in $y$ increments. An illustrative output switching matrix 30 for operation in the above mode is shown in FIG. 3, and comprises $n/4$ horizontal axes each linked by cross-points to a unique group of $y$ dedicated delay line terminals 62. Other delay line 60 tapping constructions, and corresponding sequential connection patterns thereof to the hydrophones 11, are well known to those skilled in the art. For such alternative arrangements, the matrix 30 simply comprises the requisite cross-point array to effect the successive connections between the terminals 25 and 62.

The switching control circuit 50 is illustrated in FIG. 5 and includes an oscillator 100 which supplies pulses to two cascaded counters 105 (least significant bits) and 110 (most significant bits). The counter 105 has a count capacity $y$, and completely cycles through its $y$ count states for each of the $n$ states of the counter 110.

Two series of NAND-gates 114 and 112–113 are controlled by a mode switch 122 to reproduce at the outputs of NAND-gates 116–117 either the counter state (scan mode with the switch 122 grounding a lead 120 to disable the gates 114) or the state of $y + n$ switches 55 (fixed azimuth focus mode with lead 121 being grounded to disable the NAND-gates 112–113). More specifically, the output of the gates 116–117 sequentially advances at the oscillator 100 rate to institute scan mode operation with the lead 120 ground. Correspondingly, the hydrophones 11 are focused along a particular bearing dictated by the closure pattern of the switches 55 when the lead 121 is grounded, the state of the switches 55 being electrically reproduced and maintained at the outputs of the gates 116–117.

A command decoder 90 of any conventional configuration, e.g., a plurality of multiple input ($\log_2 y$ input terminals) coincidence gates with FET gate driver output stages, operates the matrix 30 cross-point switches in the manner described above to sweep the hydrophone focus through the sector determined by the operatively selected hydrophones 11. In particular, the decoder for each FET cross-point gate may decode and respond to those of the $y$ counts at the output of NAND-gates 116, during which the associated FET is to conduct. Since many of the cross-points operate at the same times, these coincidentally operated FET gates (note the dashed ganging indications in FIG. 3) may be operated in parallel to reduce the decoding structure required.

Similarly, a corresponding matrix 20 decoder-driver 95 decodes the output of counter 110 (or the output of switches $55_{y+1}AQ55_{y+n}$ in the non-search mode), and drives the FET cross-point switches 28 and 29 in the matrix 20. As before, each FET gate may have its own decoder-driver structure to render the FET conductive during the appropriate count states; the FET gates operated during like count states may be connected in parallel to eliminate redundant decoding; and, since these FETs are operated for continuous bands of the $n$ count states, they may be controlled by a flip-flop which is set during the first conducting state of a count sequence, and reset after the last state of the conduction count sequence. Since the decoder 90 is driven by the least significant bits of the cascaded counters 105–110 and the decoder 95 is driven by the most significant bits, the matrix 30 completely steps the hydrophone focus across each of the $n$ sectors in $y$ discrete steps. Thus, the scanning operation considered above is optionally effected by the control circuit 50 of FIG. 5.

Thus, the arrangement of FIGS. 1–5 has been shown by the above to effect the requisite connections for rapidly and efficiently varying or predetermining the focus of a phased transducer array. The number of switching cross-points required for the arrangement of FIGS. 1–5 is much less than that dictated by the employment of a single nonblocking matrix to connect the hydrophones and the delay line taps. For example, where hydrophones are selectively connected to a delay line having 65 taps, only 251 cross-points are required rather than the 48 × 65 = 3,120 cross-points required by a unitary matrix, a savings of 92 percent.

It is to be understood that the above-described arrangement is only illustrative of the principles of the present invention. Numerous variations and adaptations thereof will be readily apparent to those skilled in the art without departing from the spirit and scope of the present invention. For example, other analog switches, e.g., relay contacts, may be employed as the matrix cross-point elements. Also, the transducers 11 may comprise radio frequency or other nonacoustical responsive elements operated in any environment. Also, a signal emitting transducer may be employed, with the remote signal sources generating reflections of the transmitted energy back to the receiver array 10. In this latter case, amplifiers with gated transmit-receive switched conditions might advantageously be employed. Further, three-dimensional transducer arrays may be utilized to focus the array in three-dimensional space.

Moreover, the switching system may be driven in the reverse direction (an input signal applied at the output of the delay line) for target simulation, or for phased array directional transmission.

What is claimed is:

1. In combination in a phased hydrophone transducer arrangement, a plurality of hydrophones disposed in a circular array, each of said hydrophones exhibiting a response characteristic which is substantially uniform for a broad range of bearings relative to said hydrophone, a tapped delay line including an output terminal and a plurality of input terminals, a plurality of intermediate signal terminals fewer in number than said hydrophones, input analog signal switching means for connecting a selected subset of said hydrophones to said intermediate terminals for defining an effective focusing sector for said hydrophones, output analog switching means for connecting said intermediate terminals to said delay line input terminals for defining a particular sensing axis within said sector, control means for controlling said input and output switching means, said control means includes a source of repetitive pulses, a counter cycled by said pulse source, and a command decoder including means responsive to the most significant bits of said counter for controlling said input switching means to operatively select differing subsets of said hydrophones and responsive to the least significant bits of said counter for controlling said output switching means to effect a plurality of connection patterns between said selected hydrophones and said delay line input terminals.

2. In combination, an array of transducers each having a relatively broad response characteristic, said array being capable of being electronically focused, delay means having an output terminal and a plurality of input terminals, said delay means including means for effecting a characteristic delay between each of said input terminals and said output terminal, input analog switching means for operatively selecting a subset of said plural transducers thereby focusing said transducer array within an angular sector, output switching means for selectively connecting said selected transducers to said input terminals of said delay means for defining a particular focusing direction within said sector, control means for controlling said input and output switching means, said control means including a source of repetitive pulses, a counter cycled by said pulse source, and a command decoder including means responsive to the most significant bits of said counter for controlling said input switching means to operatively select differing subsets of said transducers and responsive to the least significant bits of said counter for controlling said output switching means to effect a plurality of connection patterns between said selected transducers and said delay means input terminals for each selection of said transducers by said input analog switching means.

3. In combination, an array of transducers each having a relatively broad response characteristic, said array being capable of being electronically focused, delay means having an output terminal and a plurality of input terminals, said delay means including means for effecting a characteristic delay between each of said input terminals and said output terminal, input analog switching means for operatively selecting a subset of said plural transducers thereby focusing said transducer array within an angular sector, said input analog switching means including matrix means having a plurality of cross-point analog switches, which comprise field effect transistors, for converging outputs from said plural transducers at a fewer number of matrix output terminals, output switching means for selectively connecting said selected transducers to said input terminals of said delay means for defining a particular focusing direction within said sector.

4. In combination, an array of transducers each having a relatively broad response characteristic, said array being capable of being electronically focused, delay means having an output terminal and a plurality of input terminals, said delay means including means for effecting a characteristic delay between each of said input terminals and said output terminal, input analog switching means for operatively selecting a subset of said plural transducers thereby focusing said transducer array within an angular sector, said input analog switching means including matrix means having a plurality of cross-point analog switches for converging outputs from said plural transducers at a fewer number of matrix output terminals, output switching means for selectively connecting said selected transducers to said input terminals of said delay means for defining a particular focusing direction within said section, control means for controlling said input and output switching means, said control means including a source of repetitive pulses, a counter cycled by said pulse source, and a command decoder including means responsive to the most significant bits of said counter for controlling said input switching means to operatively select differing subsets of said transducers and responsive to the least significant bits of said counter for controlling said output switching means to effect a plurality of connection patterns between said selected transducers and said delay means input terminals for each selection of said transducers by said input analog switching means.

5. A combination as in claim 4 wherein said delay means comprises a multitapped delay line.

* * * * *

PO-1050
(5/69)

UNITED STATES PATENT OFFICE
CERTIFICATE OF CORRECTION

Patent No. 3,676,839     Dated July 11, 1972

Inventor(s) Charles J. Wohl, Jonathan L. Schere, and Thomas V. Costello

It is certified that error appears in the above-identified patent and that said Letters Patent are hereby corrected as shown below:

Page 1, the Assignee, indicated as "Edco Corporation", should be --Edo Corporation--;

Column 1, line 3, "The" should be --This--;

Column 3, line 11, "$31_1$--$31/4$" should be --$31_1$--$31_{n/4}$--;

Column 4, line 16, "$25_1$--$25/4$" should be --$25_1$--$25_{n/4}$--;

Column 5, line 16, "$55_{y+1}AQ55_{y+n}$" should be --$55_{y+1}$--$55_{y+n}$--.

Signed and sealed this 6th day of February 1973.

(SEAL)
Attest:

EDWARD M. FLETCHER, JR.          ROBERT GOTTSCHALK
Attesting Officer                Commissioner of Patents